United States Patent [19]

Dabringhaus et al.

[11] Patent Number: 5,199,449
[45] Date of Patent: Apr. 6, 1993

[54] TILTABLE ASHTRAY OR STORAGE BIN FOR MOTOR VEHICLES, OR THE LIKE

[75] Inventors: Volker Dabringhaus; Gunter Dietz, both of Wuppertal; Udo Gutlein, Taufkirchen; Hans-Joachim Haase, Altdorf, all of Fed. Rep. of Germany

[73] Assignee: Gebr. Happich GmbH, Fed. Rep. of Germany

[21] Appl. No.: 743,909

[22] Filed: Aug. 12, 1991

[30] Foreign Application Priority Data

Aug. 11, 1990 [DE] Fed. Rep. of Germany ....... 4025534

[51] Int. Cl.$^5$ .................. A24F 19/02; B60N 3/12; B60N 3/14
[52] U.S. Cl. .................. 131/231; 131/234; 131/238; 296/379; 296/37.12; 219/267; 312/242; 224/278; 224/282
[58] Field of Search .................. 296/37.9, 37.11, 37.12; 131/231, 234, 238; 312/242, 248; 224/278, 280, 282; 219/260, 267

[56] References Cited

U.S. PATENT DOCUMENTS

| 2,555,716 | 6/1951 | Todhunter | 296/37.9 X |
|---|---|---|---|
| 2,812,097 | 11/1957 | Legge | 296/37.9 X |
| 3,097,797 | 7/1963 | Crain | 131/231 X |
| 3,708,180 | 1/1973 | Bird | 296/37.9 |
| 4,537,439 | 8/1985 | Otani | 296/37.12 X |
| 4,676,544 | 6/1987 | Dabringhaus et al. | 296/37.12 X |
| 4,830,026 | 5/1989 | Yokokawa | 131/234 X |
| 4,852,932 | 8/1989 | Komeya et al. | 296/37.9 |
| 4,953,772 | 9/1990 | Phifer | 224/282 |

FOREIGN PATENT DOCUMENTS

| 3237614 | 4/1984 | Fed. Rep. of Germany | 296/37.9 |
|---|---|---|---|
| 3741096 | 6/1989 | Fed. Rep. of Germany | . |
| 3802801 | 8/1989 | Fed. Rep. of Germany | 296/37.9 |
| 0031954 | 2/1990 | Japan | 296/37.9 |
| 7801748 | 9/1979 | Switzerland | 131/238 |

Primary Examiner—Dennis H. Pedder
Attorney, Agent, or Firm—Ostrolenk, Faber, Gerb & Soffen

[57] ABSTRACT

A tiltable ashtray, e.g. for motor vehicles, includes an ash receptacle, a support housing for a lighter and a lighter which are removably disposed in a receiving housing that is tiltably pivotally supported in an external frame receivable in a recess. The ash receptacle, receiving housing and lighter can be removed from the receiving housing and replaced with a storage bin. Detachable clip connectors hold those elements in the receiving housing enabling the bin to replace the other elements, and vice-versa. A contact assembly on a circuit board in the receiving housing is connectable to an electrical system. It includes an electrical contact for the cigarette lighter and an additional contact connection to an electric light in the receiving housing.

10 Claims, 3 Drawing Sheets

TILTABLE ASHTRAY OR STORAGE BIN FOR MOTOR VEHICLES, OR THE LIKE

BACKGROUND OF THE INVENTION

The present invention refers to a tiltable ashtray or storage bin for motor vehicles, or the like uses, comprising a receiving frame which can be fastened in a wall recess, a receiving housing hinged to the frame and an ashtray insert which is removably held in the receiving housing and which can be replaced in that housing by a storage compartment or bin which holds small articles.

A tiltable ashtray of this type is known from Federal Republic of Germany Published Application OS 37 41 096. In that known ashtray the ash receptacle can be replaced with a group of audio cassettes. Otherwise, the ashtray, together with its corresponding functional parts, remains unchanged.

Federal Republic of Germany Published Application OS 38 02 801 discloses a conversion set for motor vehicles which have an ashtray receiver for a removable ashtray insert. The conversion unit includes a mount which is adapted to the ashtray receiver and which can be inserted in the receiver in place of the ashtray insert. The mount is intended for holding additional equipment, for instance, a small article such as a pocket computer, a camera, and the like, or for itself holding a container for small items such as sunglasses, a lipstick tube, and the like. In that application, the entire ashtray is replaced by a different functional part. However, this does not appear satisfactory, if only for reasons of expense.

SUMMARY OF THE INVENTION

The object of the present invention is to so develop a tiltable ashtray that it can be converted in a particularly simple, inexpensive and easily assembled manner into an article holding compartments. It is further intended that the compartment include a compartment bin of large receiving capacity. Finally the compartment should be usable without problem in the dark.

According to the invention, an ashtray insert comprises an ash receptacle that is removably held in the receiving housing by clip connections. Alongside the ash receptacle in the receiving housing, there is a cigarette lighter and a separate support housing for the cigarette lighter. The support housing is held in the receiving housing detachable clip connections.

A compartment bin can replace the ashtray insert, which includes the ash receptacle, the cigarette lighter and the support housing. The compartment bin can also be fastened by detachable clip fasteners in the receiving housing. The receiving housing carries a permanently installed contact assembly which is connected to the electrical system of the vehicle. That assembly includes a contact coupling for the cigarette lighter and at least one additional contact coupling for electric lighting means which illuminates the interior of the receiving housing.

The invention enables removal from the receiving housing not only of the ash receptacle but also of the supporting housing and the cigarette lighter therein. This produces a relatively large receiving place for a compartment bin which can be of correspondingly large dimensions and which can thus have a relatively large holding capacity for small items. Since both the support housing and the compartment bin are fastenable in the receiving housing by means of detachable clip fasteners, rapid and simple installation or removal of these parts can be effected. The contact assembly which is permanently installed in the receiving housing enables the electric connections to remain in place upon replacement of the ashtray insert with a compartment bin, or vice versa. The illuminating means provided with the invention permits easy use of the ashtray or of the compartment bin even in the dark, since the light coming from the illuminating means can be conducted into the inside of the ash receptacle or the compartment bin through a light window in a wall of the ash receptacle or the compartment bin, respectively.

Because the contact assembly is arranged on a circuit board connected to the receiving housing, this substantially contributes to the simple and inexpensive manufacture of the ashtray or compartment bin.

Other objects and features of the invention are explained by one embodiment of the invention described below with reference to the drawings.

DESCRIPTION OF THE PREFERRED EMBODIMENT

The first tiltable ashtray embodiment comprises a receiving frame 1 which can be fastened in a wall recess (not shown in detail) in a vehicle dashboard (not shown) for example, and comprises a receiving housing 2 which is hinged to the frame 1, and an ashtray insert 3 which is removably arranged in the housing 2.

Figure 1:
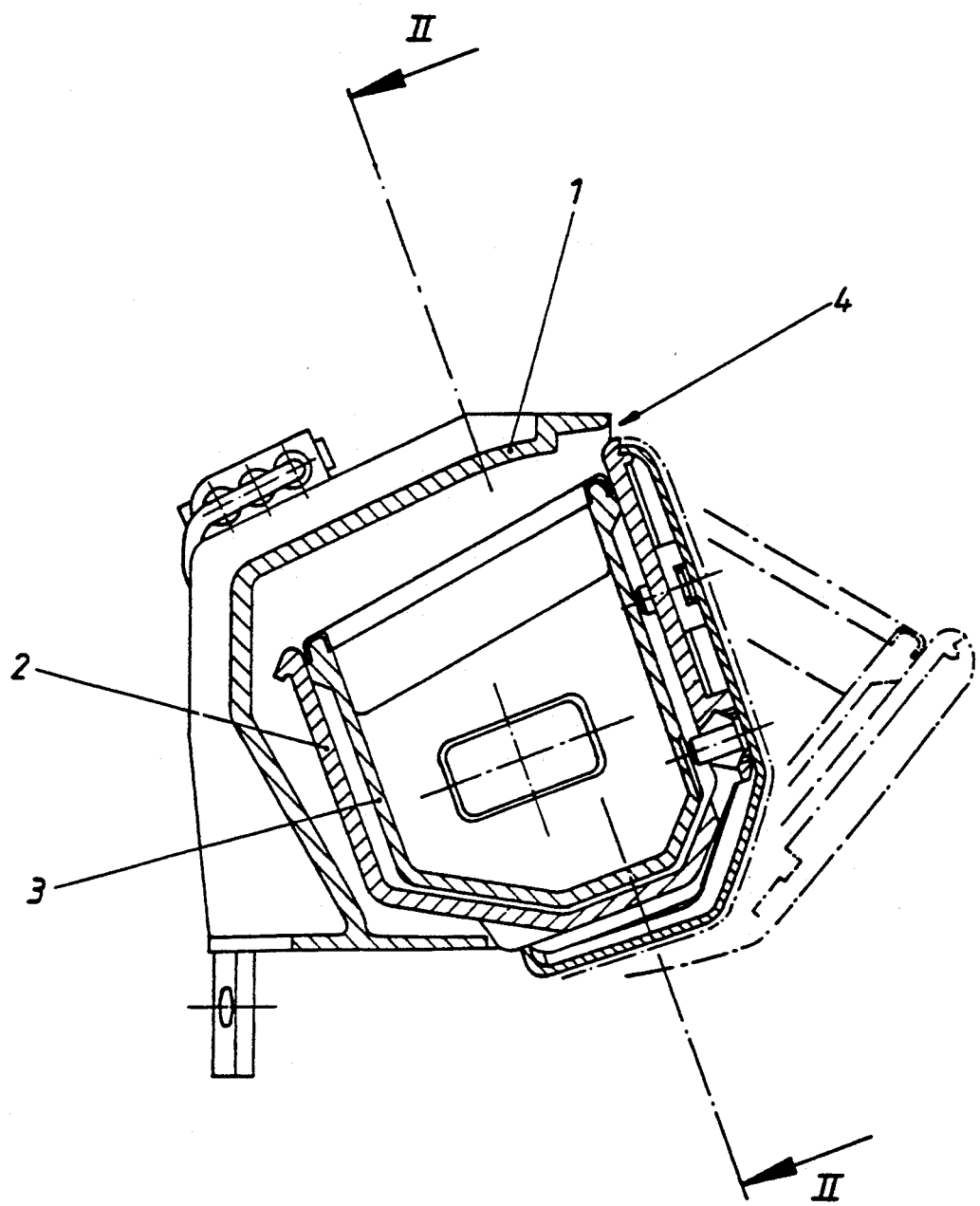
FIG. 1 shows a first, tiltable ashtray embodiment of the invention in cross section.

The receiving frame 1 has a front opening 4 which permits the installation of the receiving housing 2 and permits its tiltable mounting. In FIG. 1, the closed position of the tiltable ashtray is shown in solid lines, while the open position is shown in dot-dash lines. The receiving frame 1 may suitably be developed as a plastic injection molding also having opposite side walls 5 which are developed with bearing holes into which bearing pins 6 engage. Those pins 6 are developed on the receiving housing 2. The housing 2 and the pins 6 also preferably are an integral plastic injection molded part. The pins define a pivot hinge for the receiving housing 2.

Figure 2:
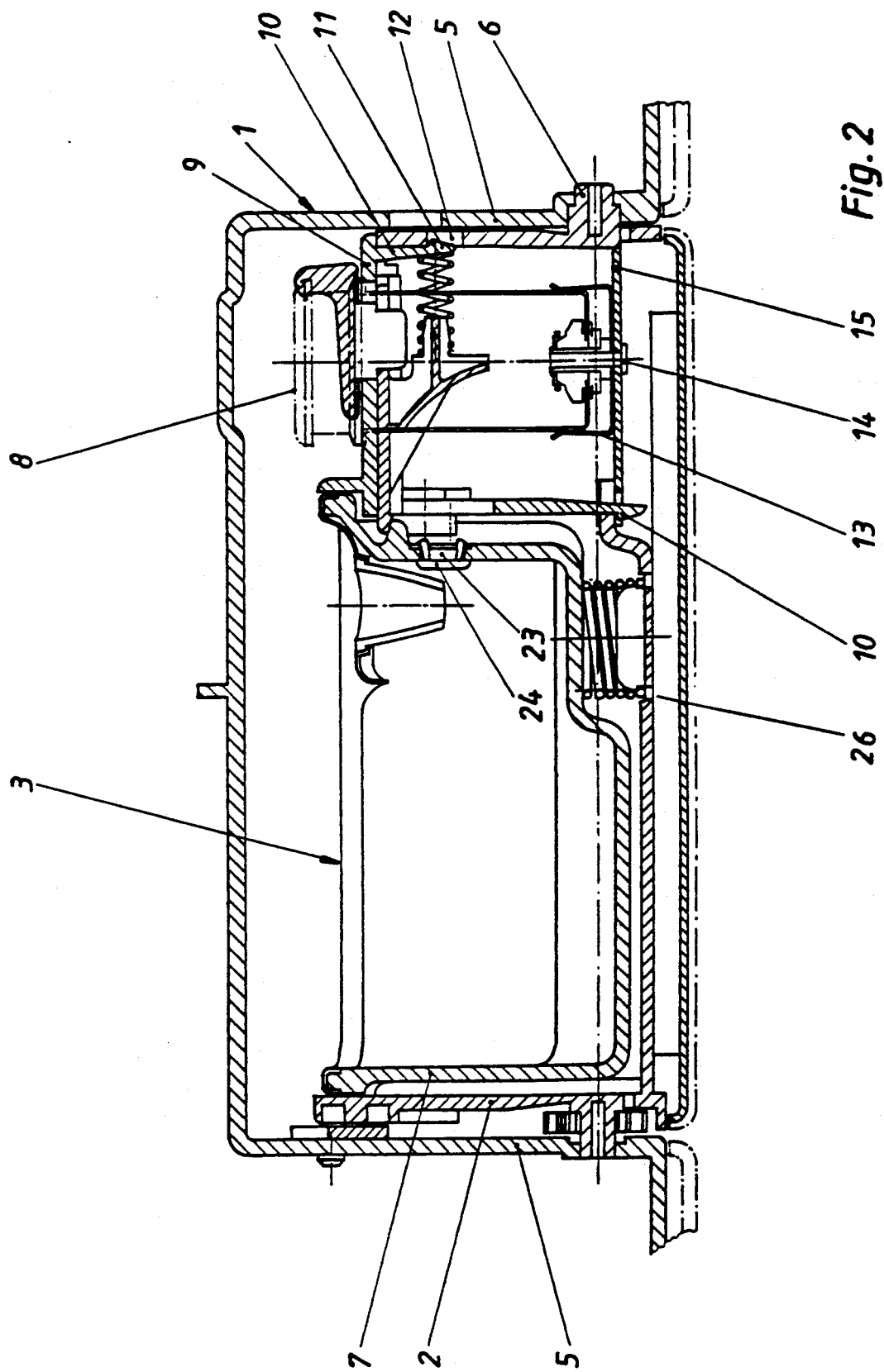
FIG. 2 is a cross section of the ashtray embodiment approximately along the line II—II of FIG. 1.

In the ashtray embodiment shown in FIG. 2, the ashtray insert 3 comprises an ash receptacle 7 to one lateral side of the receiving housing and a support housing 9 holding a cigarette lighter 8 at the other lateral side of the receiving housing. The housing 9 is preferably also developed as a plastic injection molding. The ash receptacle 7 can be removed in a conventional manner from the receiving housing 2. In this connection, known means, such as an ejection spring 26 beneath the ash receptacle and an unlocking mechanism 27 for the ash receptacle, are provided in order to bring the ash receptacle into a forward position favorable for its being gripped and so as to facilitate its removal.

The lighter support housing 9 is held in the receiving housing 2 by clip fasteners. The clip fasteners comprise detent spring arms 10 which are developed on the support housing 9 and which include integral detent end pawls 11 which engage into wall recesses 12 defined in the sides of the receiving housing 2. These clip fasteners not only afford advantages with respect to rapid and simple installation of the housing 9, but they also permit simple removal of the support housing 9.

Figure 3:
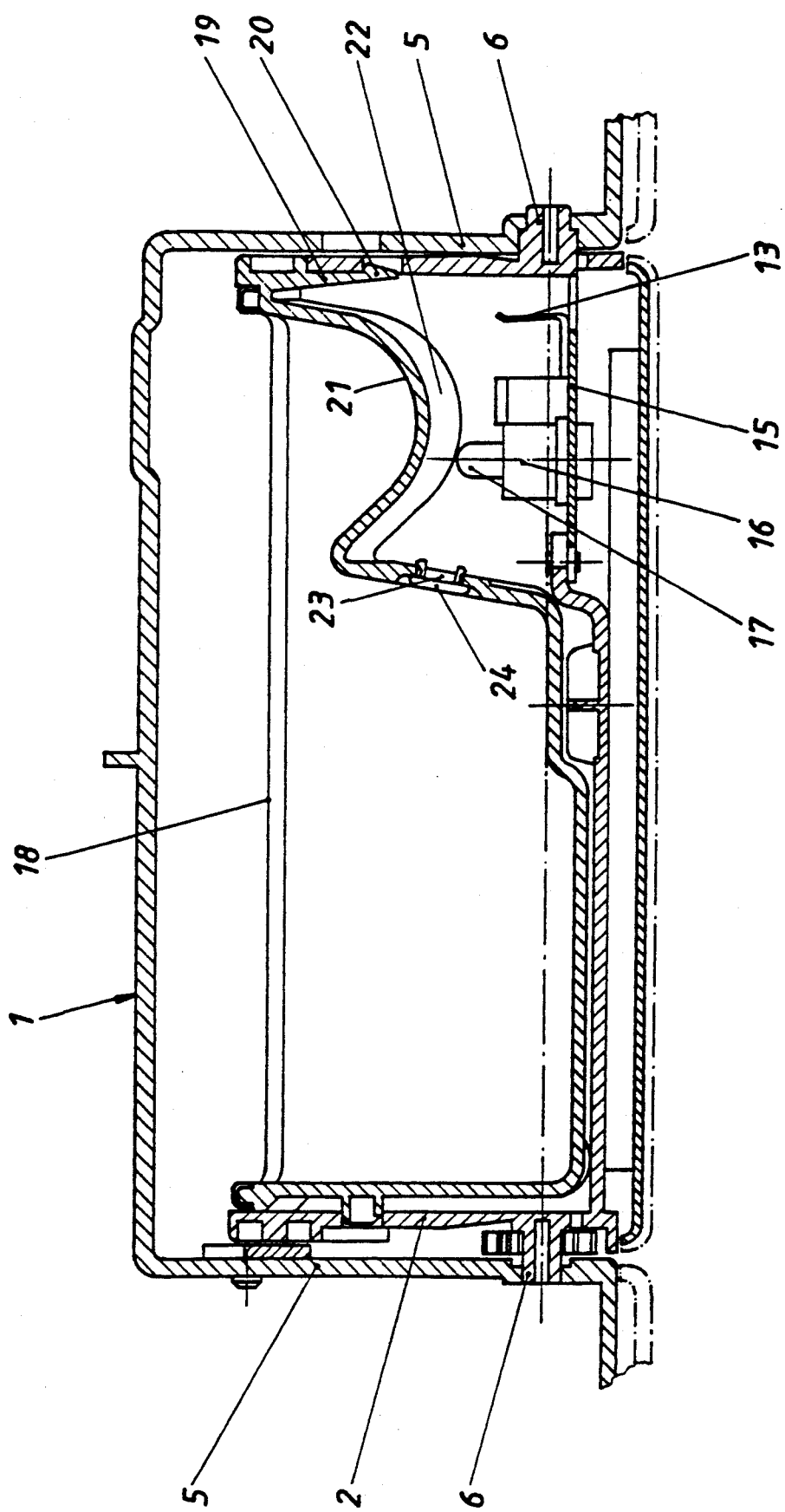
FIG. 3 is a cross section similar to that in FIG. 2 showing a second, storage compartment embodiment.

The cigarette lighter 8 extends into the housing 9 so that at its bottom end extends in removable manner into a contact coupling 13 with a contact pin 14 provided for holding the lighter in the housing 2. The contact coupling 13 together with the contact pin 14 are supported on an electric circuit board 15. The printed conducting paths of the board 15 can be connected in any suitable known manner to the electrical current supply of an automotive vehicle. As shown in FIG. 3 the circuit board 15 also supports illuminating means 16 including an incandescent bulb 17. The board 15 is firmly attached to the receiving housing 2. Plug, clip or rivet fasteners can be used for this.

In order to convert the tiltable ashtray into a holding compartment, it is merely necessary to remove the ash receptacle 7, the cigarette lighter 8 and the support housing 9 from the receiving housing 2 and to introduce a suitable compartment bin 18, as in FIG. 3, into the emptied receiving cavity of the receiving housing 2. Removal of the circuit board 15 together with the contact couplings arranged thereon is neither necessary nor is it intended. Instead, the circuit board together with the aforementioned means on it is permanently installed on the receiving housing.

FIG. 3 shows an embodiment with a compartment storage bin 18 inserted in the housing 2. The bin 18 is a plastic injection molding which can be fastened by clips on the receiving housing 2. Detent spring arms 19 developed on the compartment bin 18 are like the arms 10, and they have detent pawls 20 which engage into the wall recesses 12 of the receiving housing 2. This serves for the rapid and simple installation as well as removal of the bin 18 if the compartment is again to be converted into an ashtray.

In the region above the illuminating means 16, the compartment bin 18 has a profile that defines free space below the bin which takes the presence of the illuminating means into account. The bin is preferably developed with a trough 21 with a series of depressions 22 formed in the trough. The depressions are arranged in rows alongside of each other and may serve as coin holders.

FIGS. 2 and 3 show that the ash receptacle 7 and the compartment bin 18 are developed with window openings 23, which receive lenses 24, or the like. This enables illumination of the ash receptacle 7 or the compartment bin 18 by the illuminating means 16.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An ashtray and storage bin assembly comprising:
a frame fastenable to another object; a receiving housing supported in the frame;
an ashtray insert removably placeable in the receiving housing, the ashtray insert comprising an ash receptacle, clip fasteners on the ash receptacle for separably and removably securing the ash receptacle in the receiving housing;
a support housing in the receiving housing, support housing first fastening means in the receiving housing for enabling removable emplacement of the support housing in the receiving housing at a side of the ash receptacle;
a cigarette lighter removably disposed in the support housing, lighter support means in the support housing for receiving and supporting the lighter, whereby the lighter is installable in the support housing and the support housing is installable in the receiving housing;
a contact assembly in the receiving housing and connectable to an external electrical system, the contact assembly including a contact coupling which is positioned for electrically contacting the cigarette lighter when the cigarette lighter is installed in the support housing in the receiving housing;
electric illuminating means located in the receiving housing for illuminating the interior of the receiving housing,
the ash receptacle, the support housing and lighter being removable from the receiving housing to provide space for storage of objects in the receiving housing, while the electric contact assembly being permanently installed in the receiving housing and remaining in the receiving housing upon removal of the ash receptacle, the support housing and the lighter from the receiving housing, the space for storage of objects in the receiving housing being an upwardly open, cup-shaped, uninterrupted space extending from one side of the receiving housing to another side of the receiving housing.

2. The ashtray assembly of claim 1, further comprising a storage bin installable in the receiving housing in place of the ash receptacle and the support housing;
second storage bin fastening means on the bin for separable attachment of the bin in the receiving housing.

3. The ashtray assembly of claim 2, wherein the first and second fastening means comprise detachable clip fasteners and comprise means on the receiving housing for detachable attachment thereto of the respective clip fasteners.

4. The ashtray assembly of claim 2, wherein the bin has a floor inside the receiving housing which is profiled for defining individual compartments in the bin.

5. The ashtray assembly of claim 2, further comprising a pivot connection between the receiving housing and the frame supporting the receiving housing, the pivot connection enabling the receiving housing to be tilted from a position fully in the frame to a position outward of the frame, and the outward position of the receiving housing exposing the ash receptacle and cigarette lighter, on the one hand, and the bin, on the other hand, which is then removably fastened in the receiving housing.

6. The ashtray assembly of claim 5, wherein the pivot connection comprises a pivot bearing connection between the receiving housing and the frame about which the receiving housing is pivotable.

7. The ashtray assembly of claim 5, wherein the frame is installable in a recess which is shaped for receiving the frame.

8. The ashtray assembly of claim 2, further comprising a permanently installed circuit board attached in the receiving housing and the contact assembly for the cigarette lighter and the illuminating means being defined on and supported on the circuit board.

9. The ashtray assembly of claim 2, further comprising illumination transmission means in the ash receptacle and also in the bin and communicating respectively into the interior of the ash receptacle and to the interior of the bin, on the one hand, and toward the illuminating means in the receiving housing, on the other hand, for transmitting illumination into the ash receptacle and into the bin.

10. The ashtray assembly of claim 1, further comprising a pivot connection between the receiving housing and the frame supporting the receiving housing, the pivot connection enabling the receiving housing to be tilted from a position fully in the frame to a position outward of the frame, and the outward position of the receiving housing exposing the ash receptacle and the cigarette lighter which are then in the receiving housing.

* * * * *